(12) United States Patent
Kazantsev et al.

(10) Patent No.: US 8,522,278 B2
(45) Date of Patent: Aug. 27, 2013

(54) METHOD FOR PROVIDING PROGRAM INFORMATION IN A HIERARCHICAL MANNER AND INTERACTIVE PROGRAM GUIDE SYSTEM IMPLEMENTING THE METHOD

(75) Inventors: Sergei Kazantsev, Maple (CA); Lev Olkha, North York (CA); Eduard Zaslavsky, Maple (CA); Sergey Turivnenko, Thornhill (CA)

(73) Assignee: JLB Ventures LLC, Washington, DC (US)

( * ) Notice: Subject to any disclaimer, the term of this patent is extended or adjusted under 35 U.S.C. 154(b) by 2718 days.

(21) Appl. No.: 10/171,352

(22) Filed: Jun. 11, 2002

(65) Prior Publication Data
US 2003/0028881 A1    Feb. 6, 2003

Related U.S. Application Data

(60) Provisional application No. 60/309,507, filed on Aug. 1, 2001.

(51) Int. Cl.
*G06F 3/00* (2006.01)
*G06F 13/00* (2006.01)
*H04N 5/445* (2011.01)

(52) U.S. Cl.
USPC ............... 725/44; 725/37; 725/38; 725/39; 725/40; 725/45; 725/56; 725/58

(58) Field of Classification Search
USPC ............... 725/37, 38, 39, 40, 43, 44, 45, 52, 725/56, 57
See application file for complete search history.

(56) References Cited

U.S. PATENT DOCUMENTS

| | | | |
|---|---|---|---|
| 5,526,034 A | 6/1996 | Hoarty et al. | |
| 5,550,578 A | 8/1996 | Hoarty et al. | |
| 5,585,838 A * | 12/1996 | Lawler et al. | 725/54 |
| 5,726,702 A * | 3/1998 | Hamaguchi et al. | 725/55 |
| 6,034,678 A | 3/2000 | Hoarty et al. | |
| 6,100,883 A | 8/2000 | Hoarty | |
| 6,163,345 A * | 12/2000 | Noguchi et al. | 348/564 |
| 6,169,543 B1 * | 1/2001 | Wehmeyer | 725/47 |
| 6,205,582 B1 | 3/2001 | Hoarty | |
| 6,564,378 B1 * | 5/2003 | Satterfield et al. | 725/40 |
| 6,754,906 B1 * | 6/2004 | Finseth et al. | 725/45 |

\* cited by examiner

*Primary Examiner* — Pankaj Kumar
*Assistant Examiner* — Charles N Hicks
(74) *Attorney, Agent, or Firm* — Banner & Witcoff, Ltd.

(57) ABSTRACT

In one aspect, the invention provides a method for operating an electronic program guide system. The method comprises displaying a first view wherein graphical indicators each of which corresponds to a broadcast channel are displayed on a display; detecting input selecting one of the graphical indicators; and displaying a second view in response to the detected input, wherein programming information relating to a channel corresponding to the selected graphical indicator is displayed on the display.

7 Claims, 9 Drawing Sheets

US 8,522,278 B2

METHOD FOR PROVIDING PROGRAM INFORMATION IN A HIERARCHICAL MANNER AND INTERACTIVE PROGRAM GUIDE SYSTEM IMPLEMENTING THE METHOD

CLAIM OF PRIORITY

This application is related to, and hereby claims the benefit of, provisional application No. 60/309,507, which was filed Aug. 1, 2001 and is hereby incorporated by reference.

FIELD OF THE INVENTION

This invention relates to electronic program guides.

BACKGROUND

Electronic program guides (EPGs) are used to display programming information to viewers. In some cases, it is not unusual for an EPG for a television system to have 10,000 distinct events (i.e. a unique combination of show and time). In such cases it is important for an EPG to have a user interface that is easy to navigate or familiar to a viewer so that the viewer is not overwhelmed by the volume of programming information being presented.

SUMMARY OF THE INVENTION

According to one aspect of the invention there is provided a method for operating an electronic program guide system. The method comprises displaying a first view wherein graphical indicators, each of which corresponds to a broadcast channel, are displayed on a display; detecting input selecting one of the graphical indicators; and displaying a second view in response to the detected input, wherein programming information relating to a channel corresponding to the selected graphical indicator is displayed on the display.

According to another aspect of the invention there is provided a method for operating an electronic program guide system, the method comprising receiving programming data comprising a broadcast schedule for broadcasting programs on a channel; displaying the programming data in a hierarchical form wherein only the channel is displayed, the schedule itself being normally hidden from view.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in this specification to "one case" or "a case" means that a particular feature, structure, or characteristic described in connection with the case is included in at least one case of the invention. The appearances of the phrase "in one case" in various places in the specification are not necessarily all referring to the same case, nor are separate or alternative aspects mutually exclusive of other cases. Moreover, various features are described which may be exhibited by some cases and not by others. Similarly, various requirements are described which may be requirements for some cases but not othercases.

Figure 1:
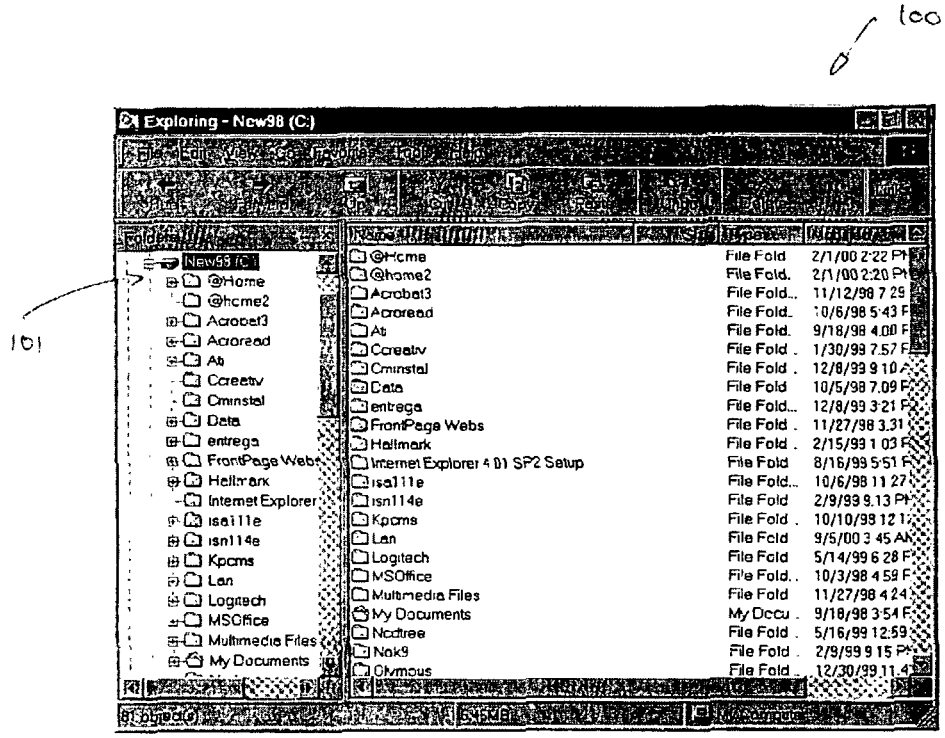
FIG. 1 shows a user interface displaying a file directory structure.

In one case, the present invention discloses a method of an EPG system which includes a user interface wherein programming information is displayed in hierarchical fashion. People are accustomed to viewing hierarchical data structures. For example, FIG. 1 of the drawings shows a Windows Explorer™ for Windows 98™ with a user interface 100. The user interface 100 includes a window 101 displaying a file directory for drive C shown as a hierarchical folder structure with all the folders closed.

Figure 2:
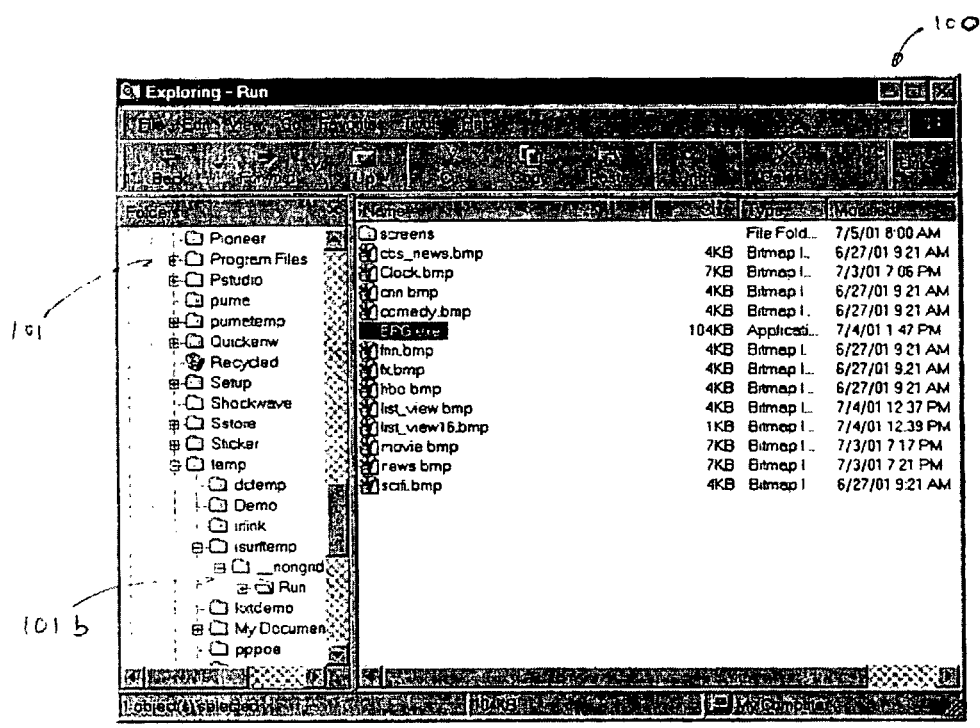
FIG. 2 shows the user interface of FIG. 1 wherein one of the folders in the file directory structure is open.

FIG. 2 shows the user interface 100 with a specific directory, namely 101b, named Run, opened. In FIG. 2, the hierarchical structure of the folder is apparent, with the contents of folder 101b shown in the window on the right hand side.

The presentation of programming information in hierarchical form facilitates readability navigation, ease of use, etc. since people are familiar with viewing information presented in hierarchical form.

Figure 3:
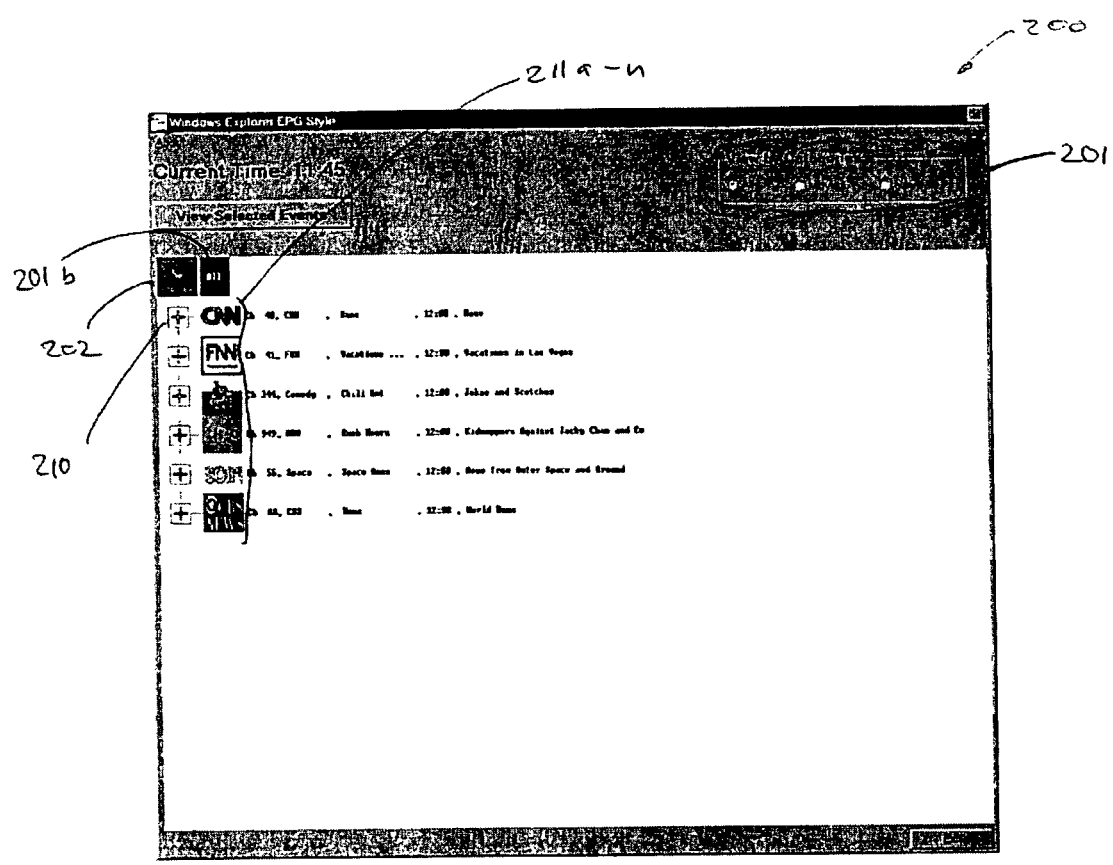
FIG. 3 shows a user interface for an EPG system in accordance with one case.

FIG. 3 shows a window 200 as an example of a user interface of an EPG in accordance with another case. In the toolbar is, for example, a selection option 201 that allows a user to choose from several views, such as "all," "movies," and "news." The viewing preferences available in selection option 201 might be refined, or might otherwise be hierarchical to some degree, so that, for example, within movies, the viewer could group selections into categories such as action movies, family movies, children's movies, and other such categories.

Other elements in FIG. 3 include a root 202; a selection indicator 201b, which essentially reflects the selection made in the selection bar 201; and a structure 210, with root elements, in this example, a selection of six channels 211a-n.

Figure 4:
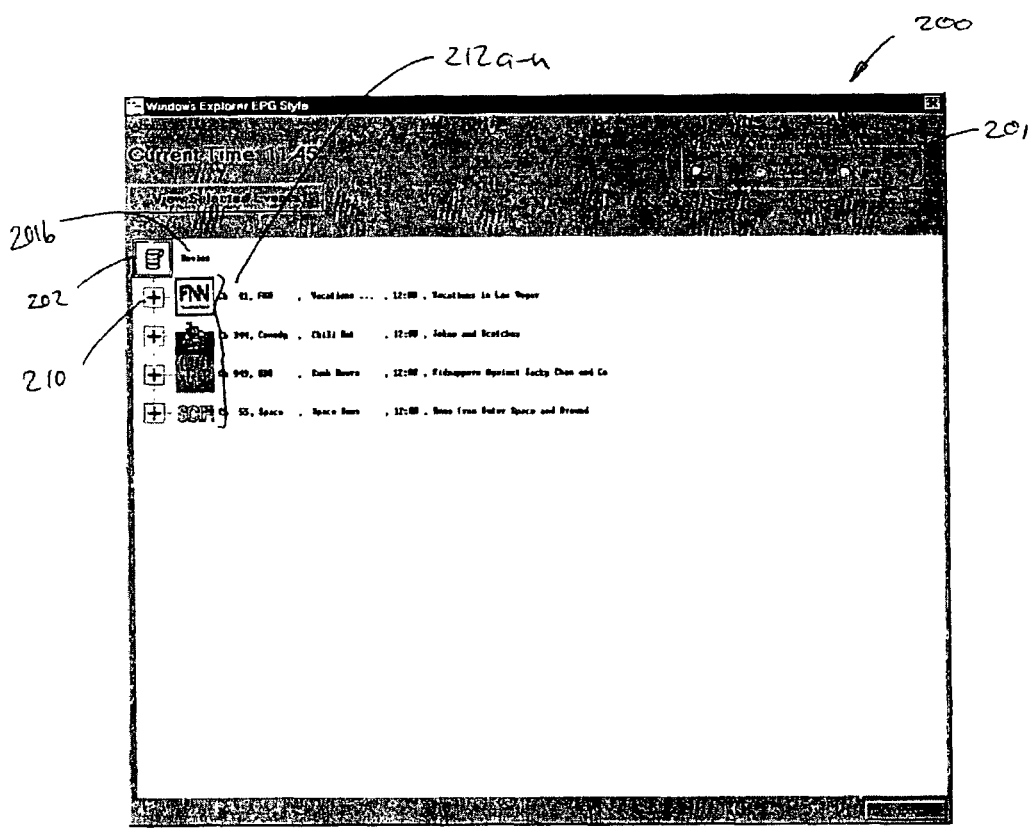
FIG. 4 shows the user interface of FIG. 3 wherein a viewer has made a different selection of channels to view.

FIG. 4 shows the same user interface of FIG. 3, wherein the selection bar 201 has moved from "all" to "movies," and accordingly, only channels 212a-n appear, which offer movies. Icons 201b and 202 have also adapted to reflect the current selection of selection bar 201.

Figure 5:
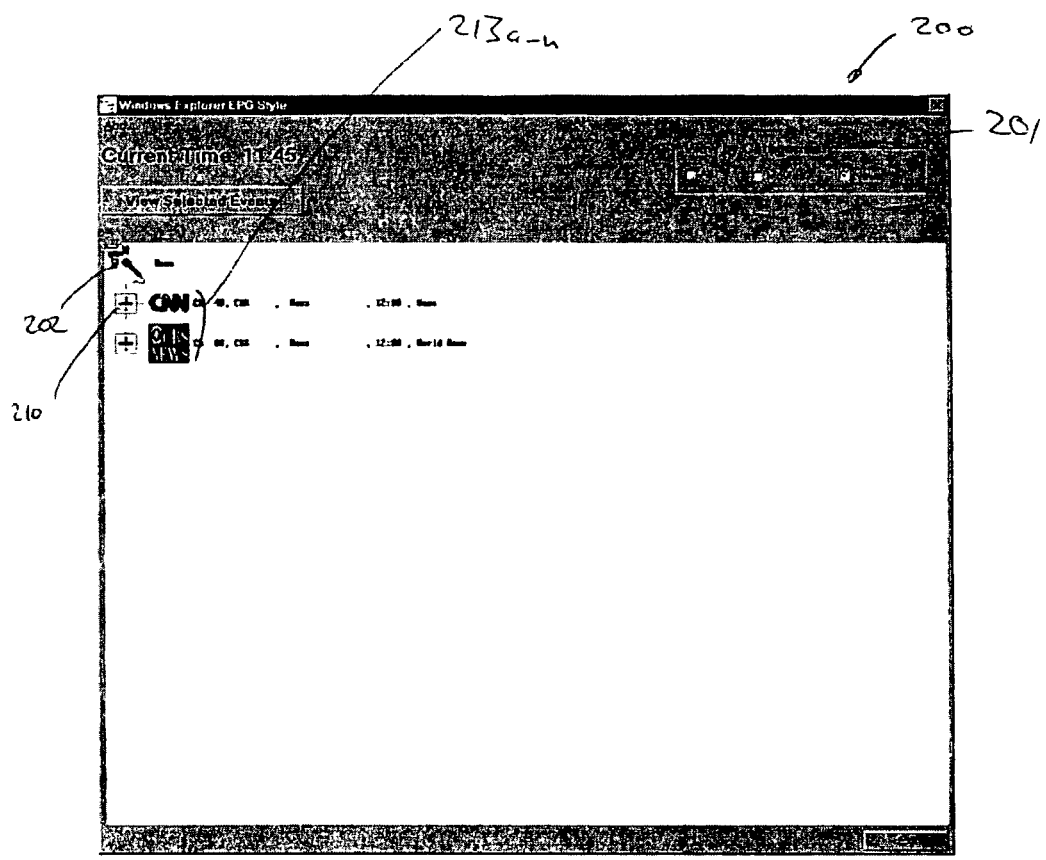
FIG. 5 shows the user interface of FIG. 3 wherein the viewer has entered another selection of channels for view.

FIG. 5 shows the same user interface of FIG. 3, wherein selection bar 201 has selected news. In response, only channels 213a-n, containing news items, appear.

Figure 6:
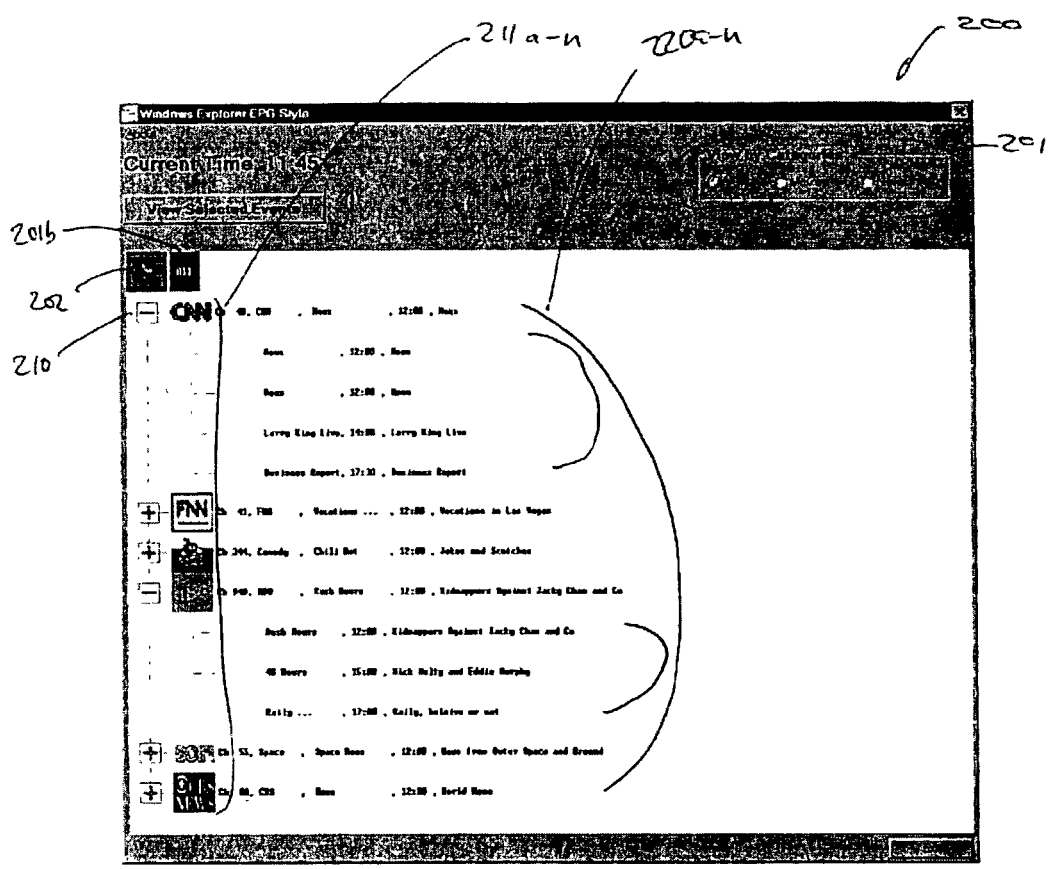
FIG. 6 shows the user interface of FIG. 3 wherein the actual programs corresponding to two channels are displayed.

FIG. 6 shows a user-interface similar to that of FIG. 3; however, two of the channels, namely CNN (211a) and HBO (211d) have been opened and now present their subordinate content as 220a-n, which are the actual program events.

Figure 7:
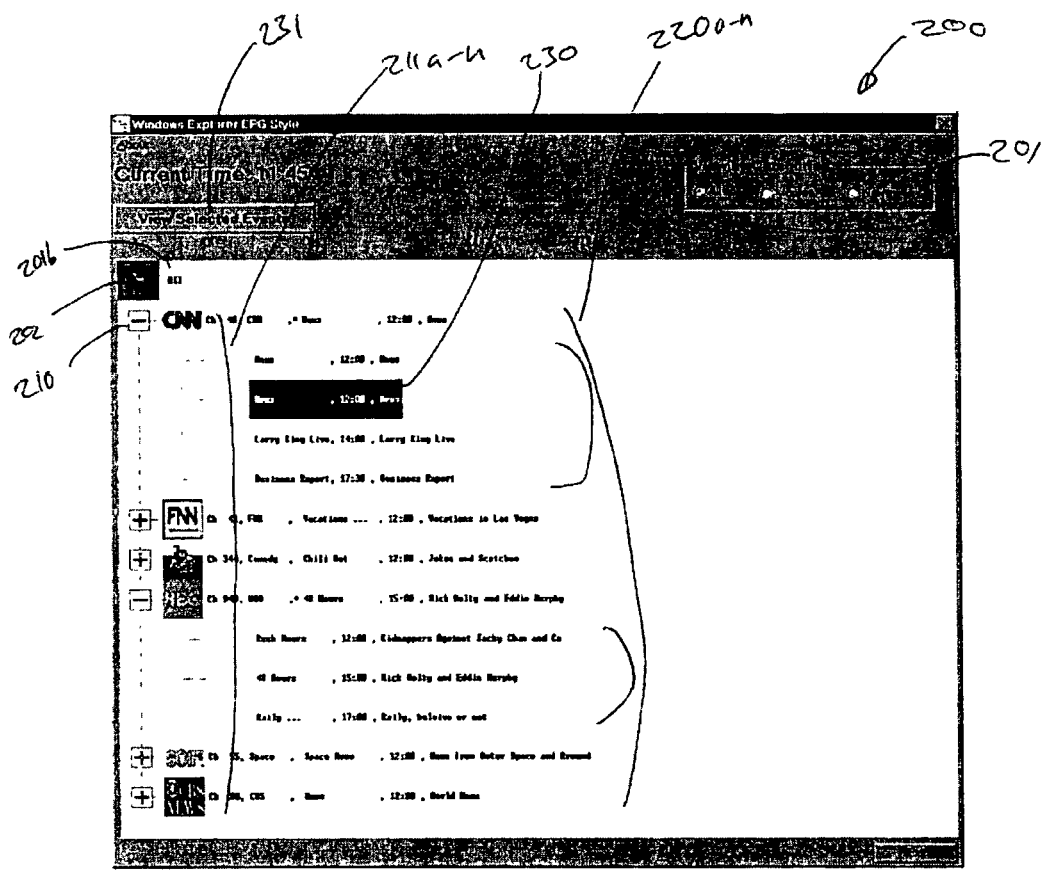
FIG. 7 shows user interface of FIG. 6 wherein a program event has been selected for viewing.

FIG. 7 shows selecting one program event as presented in FIG. 6. To activate the selection, button 231 is used in conjunction with selection bar 201. If this event is in the future, activation of the selection may be interpreted as a command to record it in the future. If this event is in the present, activation of the selection may be interpreted as switching to the selected channel for immediate viewing. Hence, simply selecting a program would not necessarily result in tuning into or recording the selected program.

As in the computer realm, multiple items may be selected and with a single click be marked for recording, reminders, or viewing. In addition, a viewer could search for programs by content and/or title, analogous to searches of computer folders, files, or text in files. However, the main difference again between a computer file listing program and a hierarchical EPG is that the files must exist in the computer system to be shown in the hierarchical listing; whereas in the TV EPG most elements actually do not exist (that is, they are not currently being shown) at the time the programs are listed in the viewer.

Figure 8:
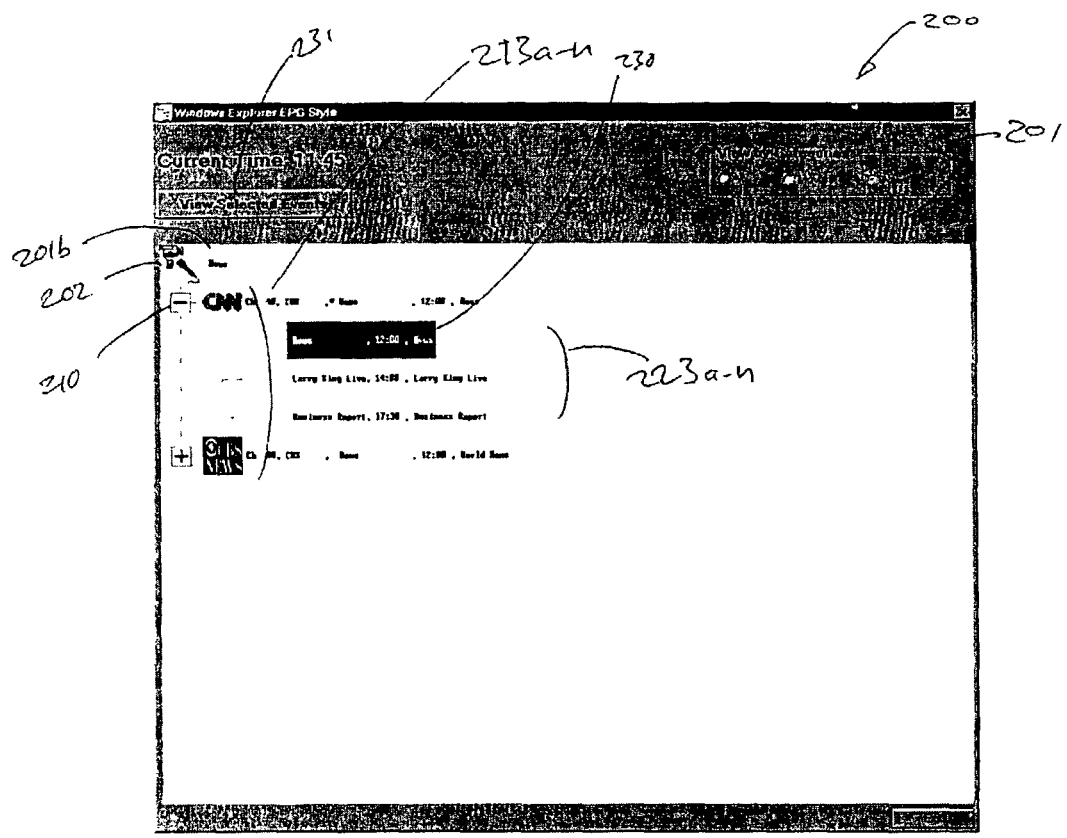
FIG. 8 shows the user interface of FIG. 7 wherein the viewer has selected a different selection of channels to view.

FIG. 8 shows an analogous situation to FIG. 7. When in FIG. 7 the user made a selection 230, it remains selected. Now by selecting the "news" in selection bar 201 all the non-news channels have been eliminated; however, selection 230 has been left visible. The selection of viewable programs has now been reduced to 223a-n and all other elements are still the same.

Figure 9:
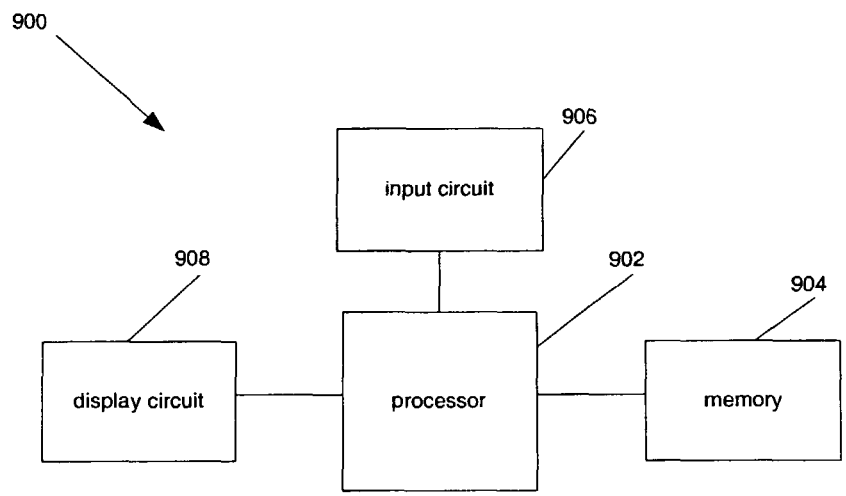
FIG. 9 shows a high level block diagram of components of an EPG system in accordance with another case.

Referring now to FIG. 9 of the drawings, reference numeral 900 generally indicates an EPG system which implements the techniques described above and displays programming information on hierarchical form. It is to be appreciated that the system 900 is highly simplified, with many components omitted, so as not to obscure the present invention. However, one skilled in the art will appreciate that such omitted components necessarily form part of system 900.

System 900 includes a memory 904 which is coupled to a processor 902. The memory stores instructions which when executed by processor 902 cause the processor 902 to perform the techniques described above. Functionally, the system 900 includes an input circuit 906 to detect input relating to various elements within a user interface and a display circuit 908, whereby various elements or objects are displayed on the user interface in hierarchical form. The design and integration of the various components of system 900 are well known and thus are not further described.

For the purposes of this specification, a computer-readable medium includes any mechanism that provides (i.e. stores and/or transmits) information in a form readable by a machine (e.g. computer) for example, a computer-readable medium includes read-only memory (ROM); random access memory (RAM); magnetic disk storage media; optical storage media; flash memory devices; electrical, optical, acoustical or other form of propagated signals (e.g. carrier waves, infra red signals, digital signals, etc.); etc.

Although the present invention has been described with reference to specific exemplary cases, it will be evident that the various modification and changes can be made to these aspects without departing from the broader spirit of the invention as set forth in the claims. Accordingly, the specification and drawings are to be regarded in an illustrative sense rather than in a restrictive sense.

What is claimed is:

1. A method comprising:
    receiving programming data comprising a broadcast schedule relating to programs of at least one broadcast channel; and
    displaying the programming data in a hierarchical form;
    receiving input from a user, the input associated with modifying a portion of the displayed programming data; and
    in response to receiving said input, expanding the portion of the programming data to display at least a portion of the broadcast schedule if the at least a portion of the broadcast schedule is not currently displayed,
    otherwise, collapsing the portion of the programming data to hide the at least a portion of the broadcast schedule, while still displaying the programming data in a hierarchical form.

2. The method of claim 1 further comprising receiving input selecting a subset of broadcast channels to display in the hierarchical form.

3. The method of claim 1 further comprising:
    receiving input selecting a particular program from the broadcast schedule; and
    in response to receiving the input, performing one or more functions in association with the selection.

4. The method of claim 3, wherein the one or more functions include displaying program information on the selected program.

5. The method of claim 1, further comprising:
    receiving input corresponding to an identification of a subset of the programming data, wherein the identification is made by a selection of one or more programming data categories; and
    in response to said received input, displaying programming data corresponding to the selected one or more programming data categories.

6. The method of claim 5, wherein at least one category of the one or more programming data categories is user definable.

7. A non-transitory computer-readable medium having stored thereon a sequence of instructions which when executed by a processor cause the processor to perform a method comprising:
    receiving programming data comprising a broadcast schedule relating to programs of a broadcast channel; and
    displaying the programming data in a hierarchical form;
    receiving input from a user, the input associated with modifying a portion of the displayed programming data; and
    in response to receiving said input, expanding the portion of the programming data to display at least a portion of the broadcast schedule if the at least a portion of the broadcast schedule is not currently displayed,
    otherwise, collapsing the portion of the programming data to hide the at least a portion of the broadcast schedule, while still displaying the programming data in a hierarchical form.

* * * * *